United States Patent [19]

Wilson

[11] Patent Number: 4,698,512

[45] Date of Patent: Oct. 6, 1987

[54] LENGTH MEASURING APPARATUS

[76] Inventor: John Wilson, Pear Tree Farm, Kelfield, York, England

[21] Appl. No.: 736,882

[22] Filed: May 22, 1985

[51] Int. Cl.[4] ............................................. G01N 21/86
[52] U.S. Cl. ..................................... 250/560; 356/387
[58] Field of Search ............................... 250/560, 561; 356/385–387

[56] References Cited

U.S. PATENT DOCUMENTS

| 3,060,791 | 10/1982 | Tarczy-Hornoch | 356/386 |
| 4,393,313 | 7/1983 | Calkins et al. | 356/386 |
| 9,515,479 | 7/1985 | Pryor | 356/384 |

FOREIGN PATENT DOCUMENTS

| 426279 | 12/1933 | United Kingdom . |
| 671377 | 3/1949 | United Kingdom . |
| 1043169 | 8/1963 | United Kingdom . |
| 1140392 | 2/1966 | United Kingdom . |
| 1109909 | 12/1966 | United Kingdom . |
| 1248617 | 11/1967 | United Kingdom . |
| 1451857 | 11/1974 | United Kingdom . |

Primary Examiner—David C. Nelms
Assistant Examiner—Crystal D. Cooper
Attorney, Agent, or Firm—Popper, Bobis & Jackson

[57] ABSTRACT

This invention describes a length measuring device for measuring dimensions of (length and width) of labels which are for high speed application to bottles, cans and the like. A label to be checked is placed on a datum mounting plate, and a light source and photoelectric cell are arranged to sense the label edges as relative measurement in the direction of the label dimension to be measured and between the datum plate and light source takes place, thereby to obtain an indication of the label dimension.

8 Claims, 3 Drawing Figures

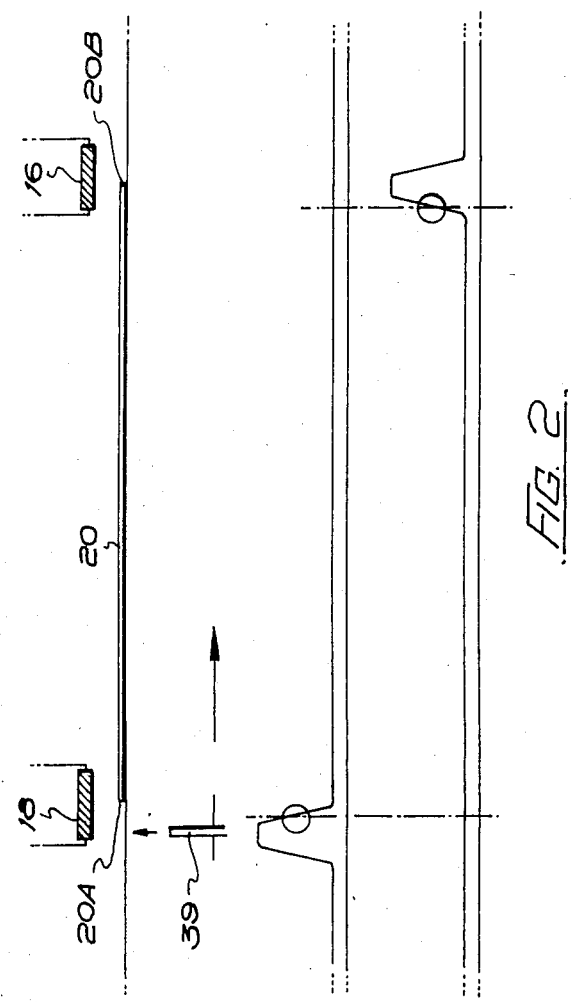

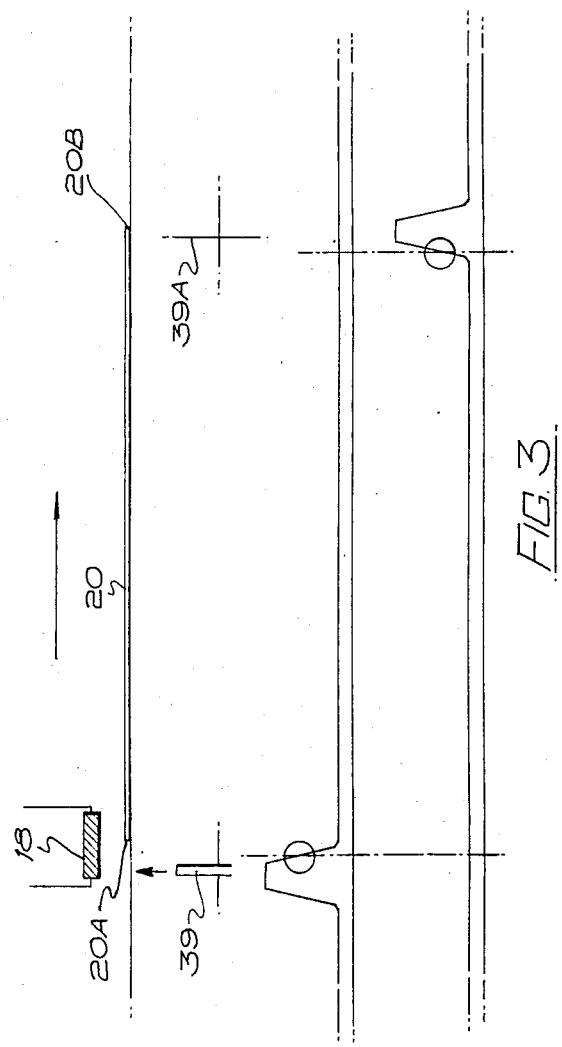

LENGTH MEASURING APPARATUS

BACKGROUND OF THE INVENTION

This invention relates to length measuring apparatus, and particularly but not exclusively concerns a length measuring apparatus for measuring accurately the length dimensions of labels which are for application to cans, bottles, and similar containers.

As the description of the invention proceeds, it will be understood however, that the actual article which is having its length dimensions measured is immaterial as long as that article has the geometric characteristics to fit the apparatus. An article which has such characteristics can have its length dimensions accurately measured, and length dimensions can and do include height and width.

As the apparatus was invented specifically to enable the accurate measurement of lables for cans, bottles or the like, reference will be made hereinafter only to the length dimensions of labels, but the views expressed above require the specification, unless the context specifically indicates or implies otherwise, to be construed accordingly.

The application of labels to metal cans, such as beer cans, takes place at high speed, i.e. of the order of 600 to 900 labels per minute, and as labels are consumed at this speed from magazines, it is important that the labels be manufactured dimensionally to a high degree of accuracy. If they are not, then there can be problems with the extraction of the labels from the magazine. This is due to the fact that the labels are stacked so that the individual labels are in substantially vertical disposition, and if a batch of labels is taller than an adjacent batch, then they cause a distinct step in the top surface created by the stacked labels, and this step causes considerable difficulties in the high speed feeding of labels from the magazine.

Customers therefore demand of label manufacturers that as regards labels for the above application, they must be manufactured to a high degree of accuracy. Label manufacturers must therefore quality control the manufacture of labels and continuously and conscientously check label length dimensions.

SUMMARY OF THE INVENTION

The present invention is an apparatus for providing such label length measurement, and seeks to provide an apparatus which will measure label length dimensions quickly and accurately. Label length measuring apparatus currently in use is a manually operated apparatus, involving the operator in manually viewing the label edges, and the positioning of a gauge to read label length dimensions.

The present invention is an automatic label length measuring device, using currently available electronics, and the apparatus according to the invention comprises a datum mounting for the label and a light source and photoelectric means arranged to sense label edges, and means for displacing the datum support and light source and/or photoelectric means whereby respective label edges dictating a length dimension can be sensed as to position, and including means for providing a signal representative of the distance between the label edges so sensed.

The means creating a signal may be connected to drive a display apparatus indicating the actual label length measurement.

The said means operating the signal may comprise an encoder disc which is turned as the result of and in proportion to the amount of relative movement between the datum mounting and the light source and/or photoelectric means.

Preferably, the datum mounting is a fixed surface, and there are two photoelectric means, at least one of which is position adjustable relative to the datum mounting, and the light source is movable in a predetermined linear path to provide a beam of light intersecting the datum mounting. Said light source may be provided by the end of an optical fibre cable, which is attached to a high precision lead screw, which is in turn coupled to an electric motor so as to be rotated when the apparatus is operative to drive a screw carrying the end of the optical cable. The datum support surface may be provided with a slot and a butting edge lying accurately at right angles to the slot and against which each label is butted, and the respective photocells may be positionable above the label edges where they intersect the said slot so that, as the light source travels along the line of the slot, the photocells will detect light up to the point where the light beam is intersected by the label edge, at which point the decoder disc will commence counting the shaft revolutions and parts thereof until the second photoelectric means senses the light beam as it emerges from under the opposite edge of the label. The signal generated by the encoder can readily be translated into length measurement. The method is very accurate, and the use of two photocells permits the approximate positioning of the label by the operator, because the photocell has a scan width, and as long as the label edge is positioned within that scan width, then accurate measurements can be obtained.

The apparatus can readily be coupled to a microcomputer so that the results can be interpolated when the apparatus is used to test a large batch of sample labels.

Typically, can labels are produced by large guillotines in ten or more reams simultaneously, and of each ten reams, the manufacturer may check the dimensions of six of these reams by taking a label from the top, a label from the middle and a label from the bottom of the ream.

Experiments with the test apparatus show the method to be accurate and reliable, and more particularly quick. The apparatus also has the advantage that it can be coupled to computing equipment for averaging a large number of results automatically.

BRIEF DESCRIPTION OF THE DRAWINGS

An embodiment of the invention will now be described, by way of example, with reference to the accompanying diagrammatic drawing, of which FIG. 2 shows how the photoelectric cells detect the label edges, and FIG. 3 shows a modification of the apparatus according to the present invention.

DETAILED DESCRIPTION OF THE PREFERRED EMBODIMENTS

Figure 1:
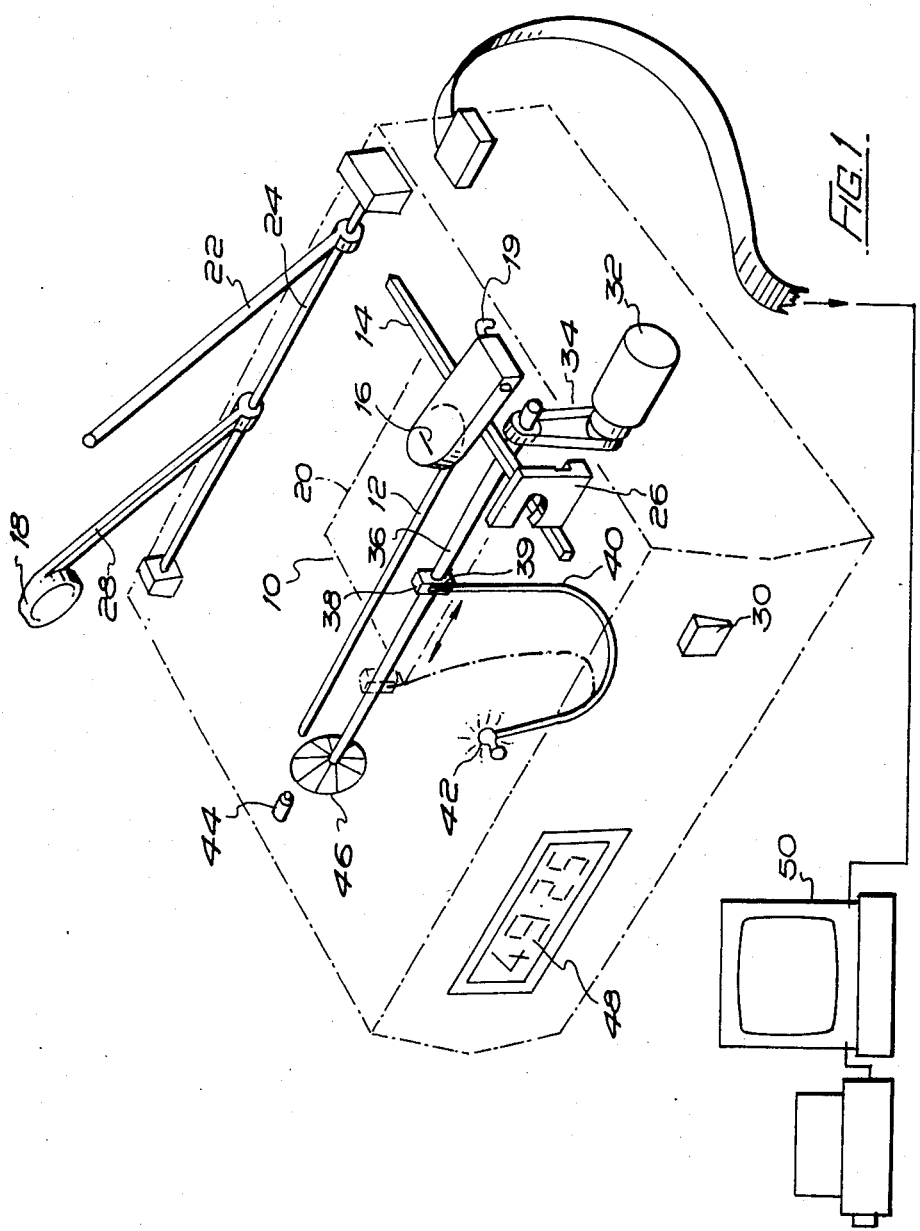
FIG. 1 shows in perspective view a length measuring apparatus according to the invention.

In the apparatus shown in FIG. 1, there is a datum support surface 10 provided with a straight slot 12 and butting edge member 14 which lies accurately at right angles to the slot 12. The slot 12 traverses the abbuting edge member 14.

The apparatus has two photocells 16 and 18, one of which is mounted on a pivot 19 lying at right angles to the slot 12, and is spring loaded so as to pivot away from the datum support surface to an extent permitting the insertion of a label under the photocell 16. When the label as indicated by numeral 20 is positioned in butting contact with the butting edge member 14, the photocell 16 is pressed downwards so as to lie over the label edge which butts against member 14, and the photocell can be held in the downwardly displaced position by means of a catch rod 22 which is pivotally mounted on a pivot rod 24 lying on one side of the datum support surface in a disposition parallel to the slot 12. When the rod 22 holds the photocell 16 in the downwardly depressed position, and end of the rod can be clipped into a retaining clip 26 at the opposite side of the datum surface.

The second photocell 18 is mounted on pivot arm 28 also pivotally mounted on rod 24, and the length of the arm is such that when the photocell is pivoted downwards onto the datum surface, it lies in register with the slot 12. The photocell 18 and the arm 28 on which it is carried are slidable longitudinally of the rod so that the photocell may be accurately positioned in relation to the label edge. To this end, the top surface of the photocell may be provided with a datum line which is for aligning as accurately as possible with the edge of the label. It is not required that the edge of the label should be exactly aligned with the datum mark as will be explained in relation to FIG. 2.

For the positioning of the label 20 whose length dimension is to be measured, it is simply a matter of positioning the label against the datum edge 14 whilst the photocell 16 is tilted to the up position, and the photocell 18 is moved clear of the datum surface. The photocell 16 is pivoted downwardly and then held captive by the captive rod 22. Next the photocell 18 is positioned as accurately as possible over the edge of the label 20 using the datum line thereon, and the label 20 is now positioned to have the length dimension which extends in the direction of the slot measured.

To do this, it is simply a matter of depressing a button 30 of the apparatus which causes the rotation of a drive motor 32. The rotation of the drive motor 32 through a two to one transmission mechanism 34 causes rotation of a high precision lead screw 36 on which is mounted a drive nut 38. Attached to the drive nut 38 is the end 39 of an optical cable 40 providing an output light beam from the cable end. The light beam derives light from a light source 42. The end 39 of the cable 40 is aligned with the slot 12, and as the nut 38 moves, so the light beam from the end 39 of the cable initially passes through the slot 12 until it is interrupted at the label edge. This interruption is detected by the photocell 18 which electronically signals to counter 44 to count the coding marks on an encoder disc 46 driven by the lead screw 36, and the counter 44 counts these marks until the second photoelectric cell 16 detects the light beam emerging from under the other edge of the label. When the count stops, the total count is translated electronically onto a reading in a display area 48, giving an accurate measurement of the label length.

FIG. 2 illustrates diagrammatically how the label length will be accurately detected provided that the label is positioned within reasonably wide limits. The photocell 18 detecting the arrival of the light beam prior to its being cut off by traversing the edge of the label 20 has a wide scanning area, and as long as the edge 20A of the label is in that scanning area, the presence of the label edge will be detected to establish a start count point, and similarly with the photoelectric cell 16 detecting the other edge 20B of the label there is a range of scanning for the photocell, and as long as the edge 20B is in that range, its position will be accurately detected by an abrupt change in the light sensed as the beam emerges from under the edge of the label, and a stop signal count will also be generated in order to terminate the counting means and initiate the conversion into a length measurement.

Referring to the arrangement in FIG. 3, this is essentially similar to FIG. 2 in that indications of the length of the label are obtained, but only one photoelectric cell 18 is provided and it is adapted to move as indicated by the arrow so as to traverse the ends of the label 20 to sense ends 20A and 20B, there being two light beams 39 and 39A directed at the label ends 20A and 20B. This arrangement is basically the mechanical inversion of the arrangement shown in FIG. 2.

In addition to displaying the length detected, the output may also be loaded into a computer 50 which can be programmed to store, sum, average and interpret the results. For example the computer may be programmed to give the extent of deviation from a motor of the lengths measured over a batch of readings.

The invention provides a simple and effective means for determining label length dimensions, and as stated herein it can be used for other articles. The mechanical layout and components used can of course be varied within a wide range of designs without departing from the scope of the invention.

The invention enables accurate measurement of labels because the device remains static during the measurement process. The accuracy of measurement from the device is to the second decimal place of millimetres. The nature of the device is such that it may be easily manufactured and is suitable for mass production.

I claim:

1. A label length measuring device comprising:
   (a) a stationary datum support surface for supporting a label thereon in a stationary manner, said datum support surface having a portion thereof through which light can pass;
   (b) an edge member fixed on the datum support surface against which one end of a label whose length is to be measured is placed;
   (c) a light source located to one side of the datum support surface;
   (d) means for moving the light source relative to the datum support surface so that in such movement a beam of light from the source passes through the datum support surface and traverses ends of and is interacted by the label placed on the datum support surface;
   (e) photoelectric means located to the other side of the datum support surface in regions of said edge member and an end of the label on the datum support surface remote from the edge member, for detecting when the beam of light is interrupted by respective label ends at said regions; and
   (f) means for providing a signal representative of a distance between the label ends at said regions in reponse to said detection by the photoelectric means.

2. A label length measuring device comprising:

(a) a stationary datum support surface for supporting a label thereon in a stationary manner, said datum support surface having a portion thereof through which light can pass;

(b) an edge member fixed on the datum support surface against which one end of a label whose length is to be measured is placed;

(c) light source means located to one side of the datum support surface in regions of said edge member and an end of the label remote from the edge member for passing a light beam through the portion of the datum support surface, adjacent ends of the label;

(d) photoelectric means located to the other side of the datum support surface for detecting light passing through the portion of the datum support surface;

(e) means for moving the photoelectric means relative to the datum support surface so that in such movement the photoelectric means traverses ends of the label, wherein the photoelectric means can detect beams of light from said light source means which define the label ends; and (f) means for providing a signal representative of a distance between the label ends at said regions in response to said detection by the photoelectric means.

3. A device according to claim 2, wherein the means for providing a signal comprises an encoder disc which is rotated as a result of and in proportion to an amount of movement by the photoelectric means relative to the datum support surface.

4. A device according to claim 1 or claim 2, wherein the means for providing a signal is connected to drive a disply apparatus which indicates a length measurement of the label in response to the signal.

5. A device according to claim 1, wherein the means for providing a signal comprises an encoder disc which is rotated as a result of and in proportion to an amount of movement by the light source relative to the datum support surface.

6. A device according to claim 5, wherein the photoelectric means includes two photoelectric devices, at least one of which is positioned adjustably relative to the datum support surface, and the light source is movable in a predetermined linear path to provide a beam of light intersecting the portion of the datum support surface.

7. A device according to claim 6, wherein said light source comprises an end of an optical fiber cable, which is attached to a high precision lead screw, which is in turn coupled to an electric motor for driving the lead screw carrying the end of the optical fiber cable.

8. A device according to claim 7, wherein the datum support surface is provided with a slot and the edge member includes a butting edge lying accurately at a right angle to the slot and against which an edge of each label is butted, and the two respective photoelectric devices are positioned above opposite label edges where they intersect said slot so that, as the light source travels along the line of the slot, the one photoelectric device detects light up to the point where the light beam is intersected by the respective label edge, at which point the encoder disc will commence counting in proportion to the amount of movement by the light source until the other photoelectric device senses the light beam as it emerges from under the opposite edge of the label.

* * * * *